United States Patent
Song

[11] Patent Number: 5,974,907
[45] Date of Patent: Nov. 2, 1999

[54] MACHINE TOOL TRANSMISSION WITH AN IMPROVED GEAR SHIFTING DEVICE

[75] Inventor: Young Ho Song, Kyongsangnam-do, Rep. of Korea

[73] Assignee: Daewoo Heavy Industries Ltd., Incheon, Rep. of Korea

[21] Appl. No.: 09/000,920

[22] Filed: Dec. 30, 1997

[30] Foreign Application Priority Data

Dec. 31, 1996 [KR] Rep. of Korea ................ 96-78711

[51] Int. Cl.[6] .................. F16H 3/22; F16H 63/32
[52] U.S. Cl. .................. 74/346; 74/373; 74/473.11; 74/473.37
[58] Field of Search ................ 74/342, 346, 373, 74/473.11, 473.37

[56] References Cited

U.S. PATENT DOCUMENTS

| | | | |
|---|---|---|---|
| 815,642 | 3/1906 | Sears | 74/342 X |
| 1,736,680 | 11/1929 | Toliver | 74/342 |
| 2,162,979 | 6/1939 | Simpson | 74/342 |
| 2,835,136 | 5/1958 | Berthiez | 74/346 |
| 3,105,675 | 10/1963 | Blackburn | 74/342 X |

FOREIGN PATENT DOCUMENTS

| | | |
|---|---|---|
| 616289 | 1/1949 | United Kingdom . |
| 1000562 | 8/1965 | United Kingdom . |

*Primary Examiner*—Allan D. Herrmann

[57] ABSTRACT

A machine tool transmission for use in changing the torque and speed of a spindle rotatingly driven by an electric motor comprises a transmission casing, input and output shafts mounted on the transmission casing in a spaced-apart, parallel relationship for rotation at different speeds from each other, a movable gear axially displaceably fitted to the input shaft for sliding movement between first and second shift positions, first and second stationary gears fixedly secured to the output shaft for rotation in unison therewith, and a gear shifting device for causing the movable gear to be shifted either into the first shift position so that the movable gear can be meshed with the first stationary gear or the second shift position so that the movable gear can be in meshing engagement with the second stationary gear. The gear shifting device includes first and second mutually opposed cylinder sections provided on the top of the transmission casing, a cylinder rod slidably received in the first and second cylinder housing sections at its opposite ends and a shift yoke attached to the cylinder rod at its proximal end and engaging with the movable gear at its distal end.

9 Claims, 4 Drawing Sheets

MACHINE TOOL TRANSMISSION WITH AN IMPROVED GEAR SHIFTING DEVICE

FIELD OF THE INVENTION

The present invention pertains generally to machine tool transmissions that serve to deliver the torque of an electric motor to a spindle at different speeds. More specifically, the invention is directed to an improvement of a gear shifting device employed in the transmission of a computerized numerically controlled lathe.

BACKGROUND OF THE INVENTION

Use has been made of a computerized numerically controlled lathe to cut workpieces into a desired shape. The lathe usually includes, among other components, a spindle with a chuck for holding workpieces to be cut and an electric drive motor drivingly connected to the spindle for causing the spindle to rotate at a preselected speed. In the course of turning operation, the torque of the spindle has to be increased or decreased depending on the cutting load. This is because the spindle requires greater torque in case of heavy cutting than needed for light cutting. The spindle torque can be changed through the use of a lathe transmission provided in between the electric motor and the spindle.

A typical example of commercially available lathe transmissions is shown in FIG. 1, which comprises a casing 10 and a couple of spaced-apart, parallel input and output shafts 12, 14 each journalled on the casing 10 with bearings 16. Affixed to the external end of the input shaft 12 is an input pully 18 which in turn is operatively associated with and rotatingly driven by an electric motor not shown for simplicity. An output pully 20 is fixedly secured to the external end of the output shaft 14 for unitary rotation therewith. The output pully 20 is in operative association with a spindle not shown.

First and second stationary gears 22, 24 are attached to the output shaft 14 in a manner that they cannot move in the axial direction of the output shaft 14. The first stationary gear 22 has a diameter smaller than that of the second stationary gear 24. A movable gear 26 with first and second gear sections 26a, 26b is axially slidably keyed to the input shaft 12 for sliding movement between a first shift position wherein the first gear section 26a of the movable gear 26 comes into meshing engagement with the first stationary gear 22 to attain reduced torque and increased rotation speed of the output shaft 14 and a second shift position wherein the second gear section 26b of the movable gear 26 is meshed with the second stationary gear 24 to accomplish increased torque and reduced rotating speed of the output shaft 14.

The sliding movement of the movable gear 26 into the first and second shift positions is effected by virtue of a gear shifting device generally designated at 30. The shifting device 30 includes a double acting shift cylinder 32 which is composed of a cylinder housing 34 mounted to the transmission casing 10 and a cylinder rod 36 slidably fitted to the cylinder housing 34. The cylinder housing 34 has a first pressure chamber 34a and a second pressure chamber 34b respectively communicating with a fluid pump(not shown) via inlet and outlet ports 34c and 34d.

The cylinder rod 36 is provided at it's internal end with a shift yoke 38 of the type remaining engaged with the movable gear 26 at one extremity thereof and slidably fitted to a guide bar 40 at the other extremity. At the external end of the cylinder rod 36, a dog 41 is provided to activate either a first proximity switch 42 to thereby stop the extending movement of the cylinder rod 36 or a second proximity switch 44 to thereby stop the retracting movement of the cylinder rod 36. Extending the cylinder rod 36 will enable the shift yoke 38 to bring the movable gear 26 into the first shift position so that the first gear section 26a of the movable gear 26 can mesh with the first stationary gear 22, whereas retracting the cylinder rod 36 will enable the shift yoke 38 to bring the movable gear 26 into the second position, thus allowing the second gear section 26b of the movable gear 26 to mesh with the second stationary gear 24.

With the conventional lathe transmission as referred to hereinabove, the shift yoke is subjected to severe wear because it continues to be in frictional contact with the rotating movable gear. Such wear may result in misalignment of the movable gear with respect to the stationary gears in the first and second shift positions. To assure exact gear alignment, the worn-out shift yoke should be replaced with a new one through a laborious replacement operation and at an increased cost. Moreover, since the shift yoke is mounted on the internal cantilevered end of the cylinder rod, a great magnitude of bending moment exerts on the cylinder rod during and after the shifting operation, which may lead to flexural deformation of the rod and leakage of the working fluid out of the cylinder housing. In addition to these deficiencies, the prior art lathe transmission is disadvantageous in that the cylinder housing of the shift cylinder must be manufactured apart from and then mounted to the transmission casing and further that it is unavoidable to use the guide bar in order to prevent unwanted rotation of the shift yoke and the cylinder rod about the axis of the latter. As a solution to the drawbacks noted above, need has existed for a lathe transmission whose gear shifting device has an enhanced structural integrity, requires a reduced number of parts and is manufacturable in a cost-effective manner.

SUMMARY OF THE INVENTION

Accordingly, it is an object of the invention to provide a machine tool transmission with an improved gear shifting device that substantially eliminates the deficiencies inherent in the prior art transmission and that can be cost-effectively manufacturable with a reduced number of parts, while exhibiting good structural integrity for an extended period of time.

With this object in mind, the present invention provides a machine tool transmission for use in changing the torque and speed of a spindle rotatingly driven by an electric motor, which comprises a transmission casing, input and output shafts mounted on the transmission casing in a spaced-apart, parallel relationship for rotation at different speeds from each other, a movable gear axially displaceably fitted to the input shaft for sliding movement between first and second shift positions, first and second stationary gears fixedly secured to the output shaft for rotation in unison therewith, and a gear shifting device for causing the movable gear to be shifted either into the first shift position so that the movable gear can be meshed with the first stationary gear or the second shift position so that the movable gear can be in meshing engagement with the second stationary gear. The shifting device includes first and second mutually opposed cylinder sections provided on the top of the transmission casing, a cylinder rod slidably received in the first and second cylinder housing sections at its opposite ends and a shift yoke attached to the intermediate portion of the cylinder rod at its proximal end and engaging with the movable gear at its distal end.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
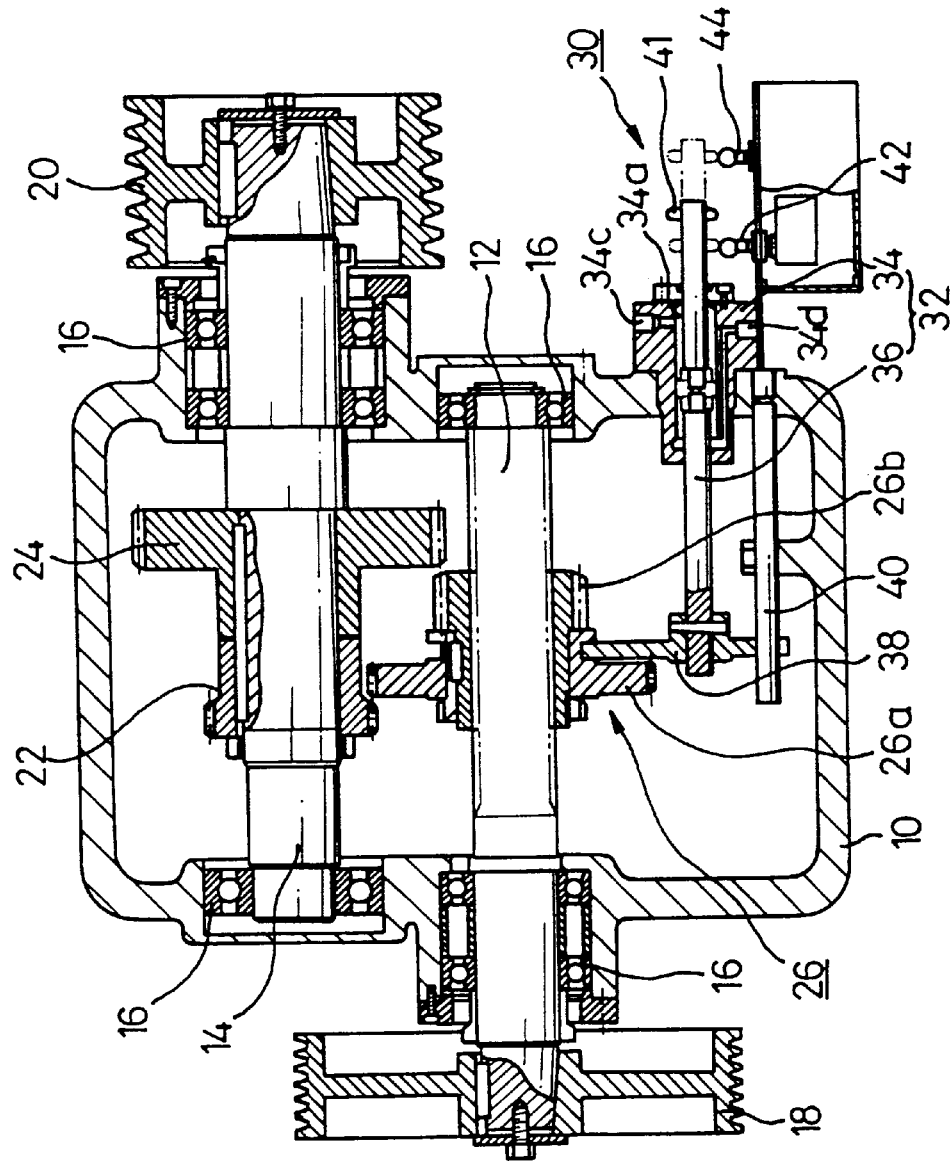
FIG. 1 is a sectional view showing a commercially available prior art lathe transmission with an input pully and an output pully drivingly connected to an electric drive motor and a spindle respectively.
Figure 2:
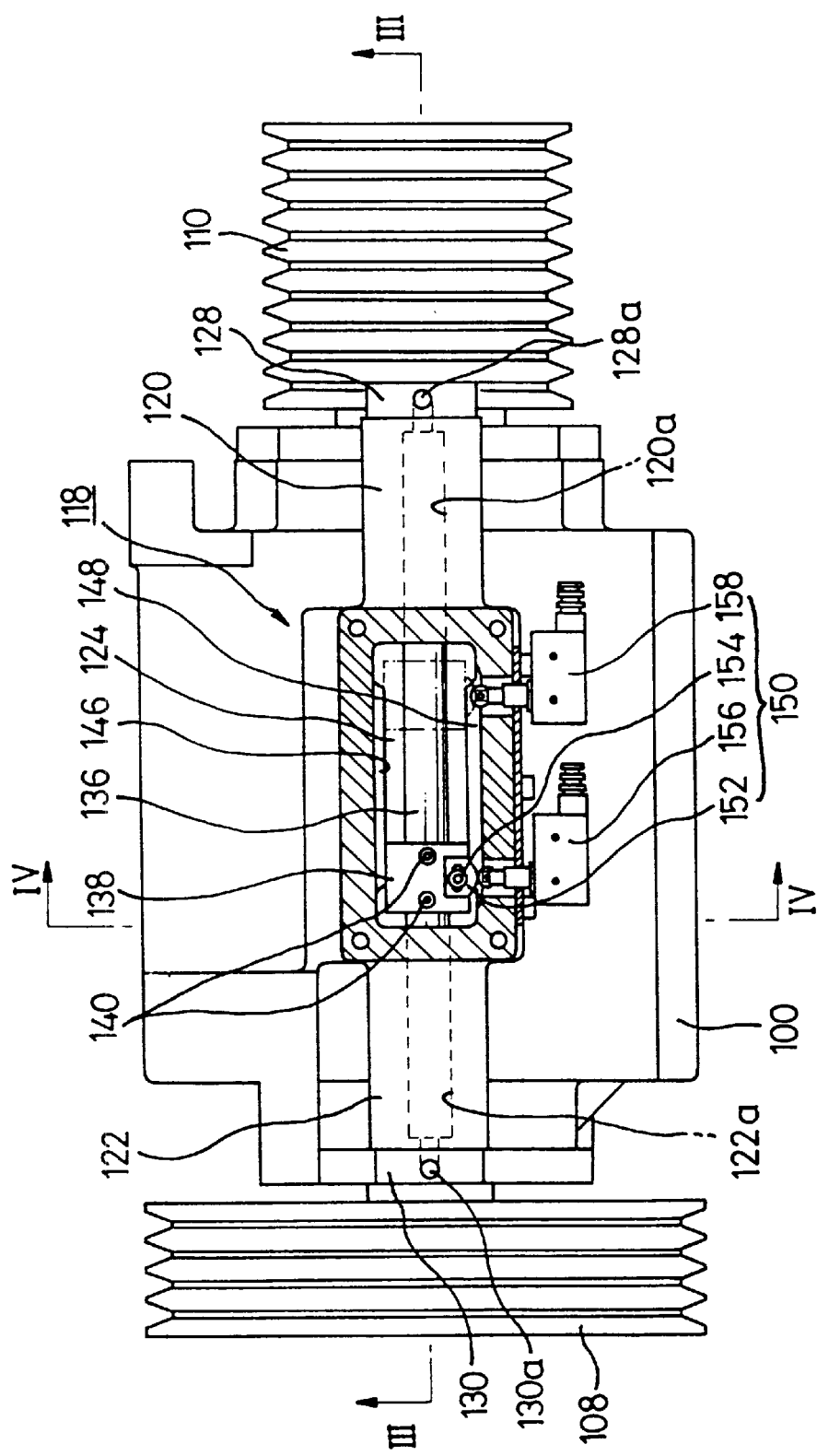
FIG. 2 is a top plan view illustrating a lathe transmission in accordance with the preferred embodiment of the invention.
Figure 3:
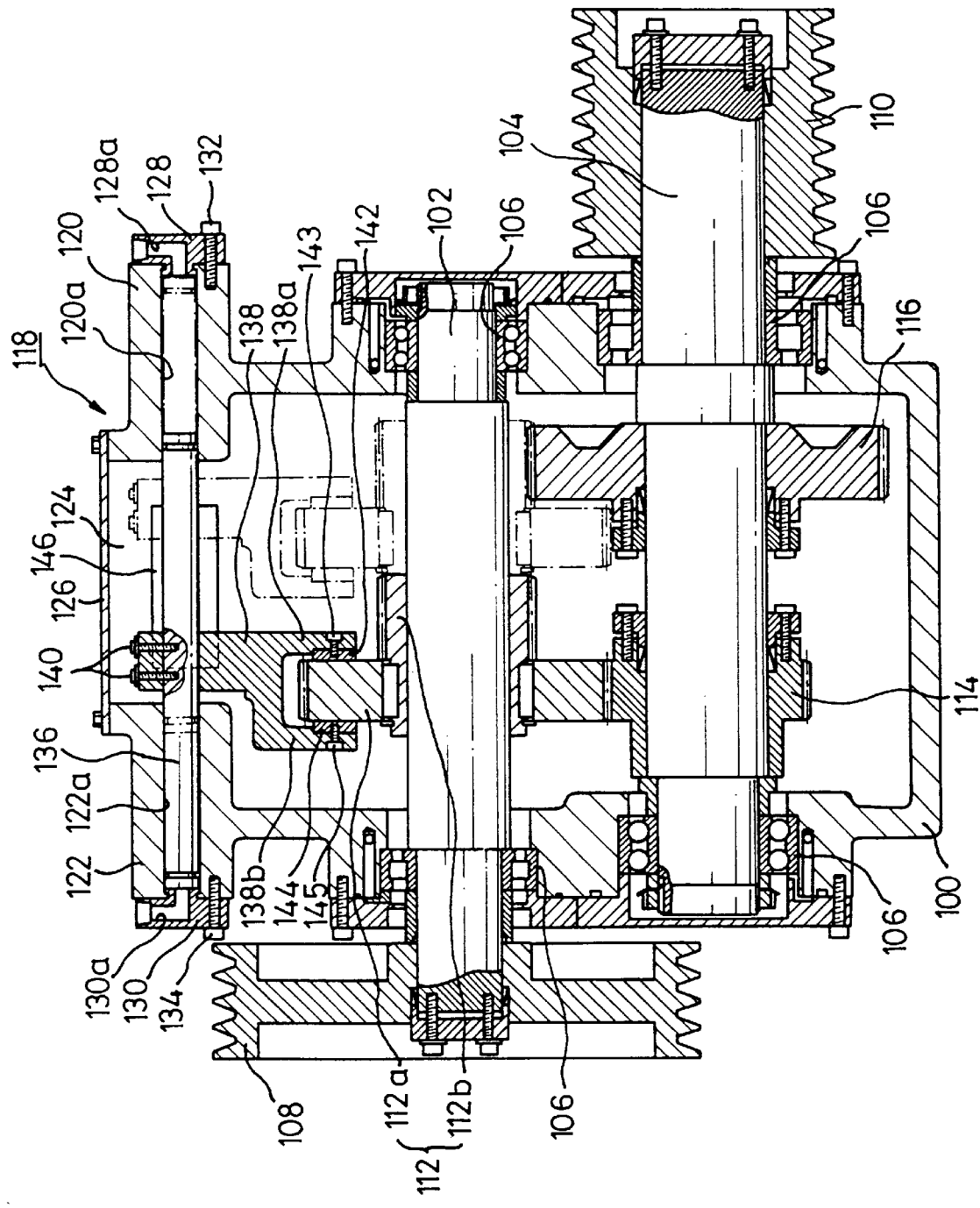
FIG. 3 is a sectional view taken along line III—III in FIG. 2, best showing the gear shifting device provided at the top of a transmission casing.
Figure 4:
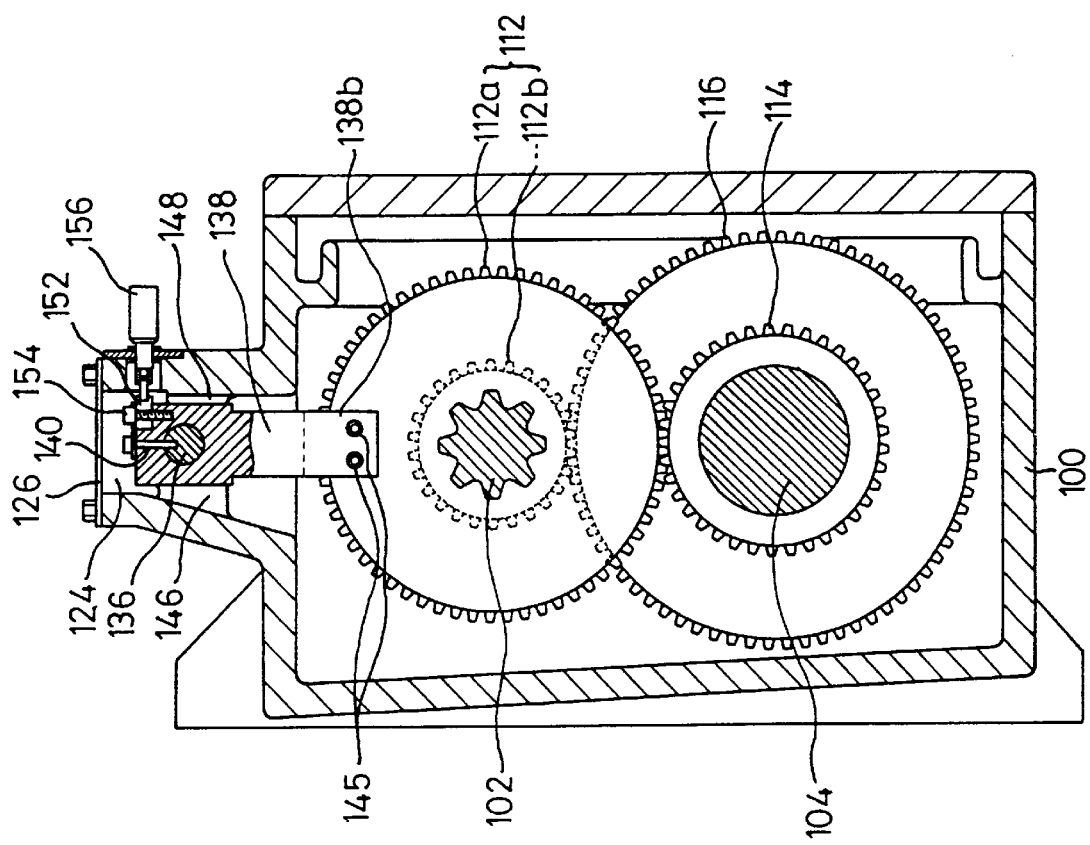
FIG. 4 is a sectional view taken along line IV—IV in FIG. 2, showing a shift yoke sandwiched between a pair of guide ledges.

Referring now to FIGS. 2 through 4, it can be seen that a lathe transmission or gear box embodying the invention comprises a transmission casing 100 built to the body of a computerized, numerically controlled lathe not shown in the drawings. Input and output shafts 102, 104 are mounted on the transmission casing 100 in a spaced-apart, parallel relationship for rotation at different speeds from each other. A plurality of journal bearings 106 are used to rotatably support the input and output shafts 102, 104 on the transmission casing 100. Affixed to the external and of the input shaft 102 is an input pully 108 which in turn is operatively associated with and rotatingly driven by an electric drive motor not shown for simplicity. At the opposite side of the transmission casing 100 from the input pully 108, an output pully 110 is secured to the external end of the output shaft 104 for rotation therewith and is drivingly connected to a spindle of the lathe also not shown in the drawings.

As is apparent in FIGS. 3 and 4, a movable drive gear 112 is axially displaceably fitted to the input shaft 102 by way of inserting the male spline of the input shaft 102 through the female spline of the movable gear 112. Thus the movable gear 112 is adapted for sliding movement between a first shift position indicated in a solid line in FIG. 3 and a second shift position illustrated in a single-dotted chain line in FIG. 3. The movable gear 112 has a first gear section 112a and a second gear section 112b whose diameter, more exactly, pitch circle diameter, is smaller than that of the first gear section 112a.

First and second stationary driven gears 114, 116 are fixedly secured to the output shaft 104 with a sufficient distance left therebetween. Rotating in unison with the output shaft 104, the first and second stationary gears 114, 116 are not permitted to move in the axial direction of the output shaft 104. The first stationary gear 114 is of such a diameter that it can be meshed with the first gear section 112a of the movable gear 112 when the latter is in the first shift position. The second stationary gear 116 has a greater diameter than the first stationary gear 114 and is able to come into meshing engagement with the second gear section 112b of the movable gear 112 while the latter is in the second shift position.

At the top of the transmission casing 100, there is provided a gear shifting device, generally designated at 118, which serves to shift the movable gear 112 either into the first shift position in which the first gear section 112a of the movable gear 112 meshes with the first stationary gear 114 or the second shift position in which the second gear section 112b of the movable gear 112 meshes with the second stationary gear 116.

The gear shifting device 118 includes first and second mutually opposed cylinder housing sections 120, 122 provided on the transmission casing 100, with an elongated yoke channel 124 left between the inner ends of the first and second cylinder housing sections 120, 122. The yoke channel 124 is formed for the purpose of receiving a shift yoke set forth below and is sealingly covered with a top cover 126 to avoid any unwanted leakage of the lubricant contained in the transmission casing 100 or any ingress into the transmission casing 100 of the alien materials such as chips and cutting fluid. Integrally formed with the transmission casing 100, each of the first and second cylinder housing sections 120, 122 has an axial bore 120a or 122a with inner and outer ends. The outer ends of the respective axial bore 120a, 122a are closed off by means of end caps 128, 130, each of which is secured to the corresponding cylinder housing section 120, 122 with screws 132, 134 and has fluid ports 128a, 130a leading to a common pressure source not shown in the drawings.

Inserted slidably through the inner ends of the axial bores 120a, 122a of the first and second cylinder housing sections 120, 122 is the opposite ends of a cylinder rod 136 that can move leftwards in FIG. 3 as a pressure medium, e.g., oil or air under pressure, is introduced into the axial bore 120a of the first cylinder housing section 120 and can move rightwards in FIG. 3 as the pressure medium is introduced into the axial bore 122a of the second cylinder housing section 122.

A shift yoke 138 of generally fork shape is affixed at its proximal end to the intermediate portion of the cylinder rod 136 by dint of locking pins 140 such that it can be subjected to unitary reciprocating movement with the cylinder rod 136. The shift yoke 138 has at its distal end a pair of bifurcated fingers 138a, 138b which receives therebetween and engages with the peripheral part of the first gear section 112a of the movable gear 112. Each of the bifurcated fingers 138a, 138b is provided with a friction pad 142, 144 of shock absorbing and noise reducing property which is replaceably attached to the inner surface of the respective one of the fingers 138a, 138b by screws 143, 145 and makes contact with the side surfaces of the first gear section 112a of the movable gear 112. The friction pads 142, 144 may be replaced with new ones when they are worn out and determined to be no longer usable.

As best shown in FIGS. 2 and 4, the transmission casing 100 has a pair of confronting guide ledges 146, 148 which project in the yoke channel 124 toward and make contact with the flank sides of the shift yoke 138 to prevent rotation of the shift yoke 138 about the axis of the cylinder rod 136. As the cylinder rod 136 moves to the left or right, the guide ledges 146, 148 serves to guide the reciprocating movement of the shift yoke 138 along a straight way.

A position detector device 150 is employed to detect the position of the shift yoke 138 to assure that the shift yoke 138 is stopped exactly at the first or the second shift position by way of controlling the movement of the cylinder rod 136. In the illustrated embodiment, the position detector 150 includes a dog 152 attached to the top surface of the shift yoke 138 by a screw 154 and first and second limit switches 156, 158 mounted to the transmission casing 100 along the moving way of the dog 152 in a spaced-apart relationship with each other.

It should be appreciated that the stroke of the shift yoke 138 is substantially equal to the spacing of the limit switches 156, 158 as well as to the spacing of the first and second stationary gears 114, 116. This means that the dog 152 becomes in alignment with the first limit switch 156 and activates same when the shift yoke 138 is moved into the first shift position at the end of its leftward movement. As the shift yoke 138 is moved into the second shift position at the end of its rightward movement, the dog 152 is adapted to come into alignment with the second limit switch 158 and activate same.

Although not shown in the drawings, the limit switches 156, 158 are electrically connected to a well known controller which governs the supply of the pressure medium into the axial bores 120a, 122a of the first and second cylinder housing sections 120, 122. The controller serves to cease introduction of the pressure medium into the axial bore 120a of the first cylinder housing section 120 in case the first limit switch 156 is activated by the dog 152. If the second limit switch 158 is activated, the controller is adapted to stop introduction of the pressure medium into the axial bore 122a of the second cylinder housing section 122.

Gear shifting operation of the lathe transmission as referred to above will now be described below.

Introducing the pressure medium into the axial bore 120a of the first cylinder housing section 120 causes the cylinder rod 136 to move leftwards whereby the shift yoke 138 is brought into the first shift position as indicated in a solid line in FIG. 3. Just when the shift yoke 138 reaches the first shift position, the dog 152 comes into contact with and activates the first limit switch 156 of the position detector device 150 as illustrated in a solid line in FIG. 2. Activation of the first limit switch 156 enables the controller(not shown) to cease further supply of the pressure medium into the axial bore 120a of the first cylinder housing section 120, thus causing the shift yoke 138 to stop at the first shift position. As the shift yoke 138 moves into the first shift position, the first gear section 112a of the movable gear 112 meshes with the first stationary gear 114 such that the output shaft 104 and the output pully 110 are caused to rotate at a greater speed and lower torque than the input shaft 102 and the input pully 108, resulting in an increased speed and reduced torque of the lathe spindle.

On the contrary, admitting the pressure medium into the axial bore 122a of the second cylinder housing section 122 causes the cylinder rod 136 to move rightwards whereby the shift yoke 138 is brought into the second shift position as indicated in a single-dotted chain line in FIG. 3. At the moment the shift yoke 138 reaches the second shift position, the dog 152 comes into contact with and activates the second limit switch 158 of the position detector device 150 as illustrated in a single-dotted chain line in FIG. 2. Activation of the second limit switch 158 enables the controller to cease further supply of the pressure medium into the axial bore 120a of the second cylinder housing section 120, thus causing the shift yoke 138 to stop at the second shift position. As the shift yoke 138 moves into the second shift position, the second gear section 112b of the movable gear 112 meshes with the second stationary gear 116 such that the output shaft 104 and the output pully 110 are caused to rotate at a lower speed and greater torque than the input shaft 102 and the input pully 108, leading to a reduced speed and increased torque of the lathe spindle.

While the invention has been shown and described with reference to a preferred embodiment, it should be apparent to one of ordinary skill in the art that many changes and modifications may be made without departing from the spirit and scope of the invention as defined in the claims.

What is claimed is:

1. A machine tool transmission comprising:

a transmission casing;

first and second rotating shafts mounted on the transmission casing in a spaced-apart, parallel relationship for rotation at different speeds from each other;

a movable gear axially displaceably fitted to the first rotating shaft for sliding movement between first and second shift positions;

first and second stationary gears fixedly secured to the second rotating shaft for rotation in unison therewith; and means for causing the movable gear to be shifted either into the first shift position wherein the movable gear is meshed with the first stationary gear or the second shift position wherein the movable gear is meshed with the second stationary gear, the gear shifting means including first and second mutually opposed cylinder housing sections provided on the transmission casing, a cylinder rod slidably received in the first and second cylinder housing sections at its opposite ends and a shift yoke attached to the cylinder rod at a proximal end of the shift yoke and engaging with the movable gear at a distal end of the shift yoke, wherein the transmission casing has a yoke channel provided between the first and second cylinder housing sections for accommodating at least the proximal end of the shift yoke.

2. The machine tool transmission as recited in claim 1, wherein the the transmission casing is provided with a pair of confronting guide ledges each making contact with flank sides of the shift yoke.

3. The machine tool transmission as recited in claim 1, wherein the the shift yoke of the gear shifting means has a pair of bifurcated fingers at the distal end thereof engageable with the movable gear.

4. The machine tool transmission as recited in claim 3, wherein each of the bifurcated fingers is provided with a friction pad replaceably attached thereto and making contact with the movable gear.

5. The machine tool transmission as recited in claim 1, further comprising means for detecting the position of the shift yoke to have the shift yoke stopped at the first or second shift position.

6. The machine tool transmission as recited in claim 5, wherein the position detecting means includes a dog attached to the shift yoke and first and second limit switches mounted to the transmission casing, the limit switches being arranged such that the first switch can be activated by the dog when the movable gear is in the first shift position, while the second switch can be activated when the movable gear is in the second shift position.

7. The machine tool transmission as recited in claim 1, further comprising a cover demountable attached to the transmission casing for sealingly closing off the yoke channel.

8. The machine tool transmission as recited in claim 1, wherein each of the first and second cylinder housing sections has an axial bore for receiving the respective end of the cylinder rod.

9. A lathe transmission comprising:

a transmission casing;

input and output shafts mounted on the transmission casing in a spaced-apart, parallel relationship for rotation at different speeds from each other;

a movable gear axially displaceably fitted to the input shaft for sliding movement between first and second shift positions, the movable gear having first and second gear sections, the first gear section being of greater diameter than the second gear section;

first and second stationary gears fixedly secured to the output shaft for rotation in unison therewith and having their positions in exact alignment with the first and second shift positions of the movable gear; and a gear shifting device for causing the movable gear to be shifted either into the first shift position in which the first gear section of the movable gear is meshed with the first stationary gear or the second shift position wherein the second gear section of the movable gear is meshed with the second stationary gear, the gear shifting device including first and second mutually opposed cylinder housing sections provided on the transmission casing, a cylinder rod slidably received in the first and second cylinder housing sections at its opposite ends and a shift yoke attached to the cylinder rod at its proximal end and engaging with the first gear section of the movable gear at its distal end, wherein the transmission casing has a yoke channel provided between the first and second cylinder housing sections for accommodating at least the proximal end of the shift yoke.

\* \* \* \* \*